United States Patent [19]

Yamaguchi et al.

[11] Patent Number: 4,813,511
[45] Date of Patent: Mar. 21, 1989

[54] MOTORCYCLE

[75] Inventors: Ken Yamaguchi; Akio Kawano; Kenji Honma; Tsutomu Sakuma; Keizi Ono, all of Saitama, Japan

[73] Assignee: Honda Giken Kogyo Kabushiki Kaisha, Tokyo, Japan

[21] Appl. No.: 129,330

[22] Filed: Dec. 3, 1987

Related U.S. Application Data

[63] Continuation of Ser. No. 878,413, Jun. 25, 1986, abandoned.

[30] Foreign Application Priority Data

Jun. 25, 1985 [JP] Japan ................................. 60-138190
Oct. 15, 1985 [JP] Japan ................................. 60-229581
Oct. 30, 1985 [JP] Japan ................................. 60-244371

[51] Int. Cl.⁴ ............................................. B62K 25/16
[52] U.S. Cl. ..................................... 180/219; 180/132; 280/275; 280/284
[58] Field of Search ............................. 180/219, 132; 280/281 R, 284, 288, 275

[56] References Cited

U.S. PATENT DOCUMENTS

| 3,642,083 | 2/1972 | Rodler, Jr. | 180/219 |
| 4,189,168 | 2/1980 | Courtney | 280/284 |
| 4,265,329 | 5/1981 | de Cortanze | 280/284 |
| 4,475,615 | 10/1984 | Stanek | 180/132 |

FOREIGN PATENT DOCUMENTS

918188 8/1954 Fed. Rep. of Germany.
555975 9/1943 United Kingdom.

Primary Examiner—David M. Mitchell
Assistant Examiner—Donn McGiehan
Attorney, Agent, or Firm—Lyon & Lyon

[57] ABSTRACT

Motorcycles having front and rear swing arm assemblies as the suspension members therefor are employed with lower frame structures incorporating the power unit as a structural element thereof. The lower frame structures are shown to include brackets mounted to the power unit itself, separate loop frame members and an under channel member. Upper frames are shown to be associated with the lower frames. The upper frames do not support the suspension systems but do support motorcycle equipment such a fuel tanks, air cleaners and the like.

5 Claims, 8 Drawing Sheets fig. 1.

MOTORCYCLE

This application is a continuation of application Ser. No. 878,413, filed June 25, 1986, now abandoned.

BACKGROUND OF THE INVENTION

The field of the present invention is the structural architecture and arrangement of motorcycles.

Conventional motorcycles have typically employed a frame structure within which a power unit, comprising an engine and transmission, is mounted. A rear swing arm suspension is typically employed on such vehicles and a telescopic front fork mechanism pivotally mounted to a head tube on the frame is employed for the front suspension thereof.

Motorcycle architecture has, from time to time, been changed to accomplish certain specific design requirements. To reduce weight and lower the center of gravity of such a vehicle, an arrangement has been known which eliminates the front fork mechanism and replaces it with a swing arm suspension mechanism. One such device is illustrated in Japanese Patent Publication No. 58,49435, U.S. Pat. No. 4,265,329. This prior device employs front and rear swing arms mounted to the engine which provides the frame structure of the vehicle. A tripod arrangement is employed to mount the handlebar assembly directly to the frame structure defined by the vehicle power unit. This arrangement has been found to be very light with a low center of gravity due to the simplified body frame.

In spite of the foregoing advantages, such a vehicle has found disadvantage in the elimination of the frame. Motorcycle equipment necessary for the operation of the vehicle, such as the handlebar, a seat, a fuel tank and lights have been individually mounted on the frame structure. Thus, to work on the power unit, or to otherwise initially assemble the vehicle, extensive labor is required to remove the several separately mounted pieces of equipment. Furthermore, an arrangement employing the power unit as the entire frame structure sacrifices flexibility in the mounting of the suspension systems, likely to require heavy plate members, and in the location of components such that space may be optimized without detracting from any equipment component.

SUMMARY OF THE INVENTION

The present invention is directed to the structural architecture of a motorcycle so as to maintain minimum weight and a lower center of gravity and yet provide maximum space utilization and versatility in the mounting of the suspension systems and the motorcycle equipment. As used in this application the term, "motorcycle equipment," means equipment other than the power unit, the wheel suspension systems including the wheels, such as, for example, the seat, the handlebar and associated steering mechanism, the radiator, the air cleaner, the fuel tank, headlights, cowling, etc. To this end, a lower frame including the power unit is contemplated in cooperation with an upper frame for supporting a plurality of necessary equipment components for the vehicle. To minimize weight, the upper frame does not participate in the support of the suspension assemblies.

In a further aspect of the present invention, looped side frames are incorporated with the power unit to define the lower frame structure supporting both the upper frame structure and the suspension assemblies. Alternately, a channel-like frame structure may be employed with the power unit to define the lower frame. In either case, the power unit is more easily serviced without requiring substantial disassembly of the vehicle.

In another aspect of the present invention the character of the upper frame structure may incorporate box frames assembled together which themselves may define containers for various pieces of equipment. Rail structures employing upwardly extending stays may also be contemplated as a means for affixing motorcycle equipment to the lower frame structure.

Accordingly, it is an object of the present invention to provide a motorcycle architecture having certain weight and center of gravity advantages and efficient assembly and arrangement attributes. Other and further objects and advantages will appear hereinafter.

DETAILED DESCRIPTION OF THE PREFERRED EMBODIMENTS

Turning in detail to the drawings, a first embodiment is illustrated in FIGS. 1 through 4. A motorcycle is shown to comprise a power unit 2 integrally consisting of a V-type engine and a gear box. The V-type engine has front and rear cylinder blocks 2a and 2b, respectively. The power unit 2 is arranged with its crankshaft extending transversely to the longitudinal axis of the vehicle and is positioned centrally on the vehicle. Front brackets 5 are fixed to a front portion of the power unit 2 on either side thereof for pivotally supporting a front swing arm 4 which in turn supports a front wheel 3. Rear brackets 8 are fixed to either side of the rear portion of the power unit 2 and pivotally support a rear swing arm 7 which in turn supports a rear wheel 16.

Figure 1:
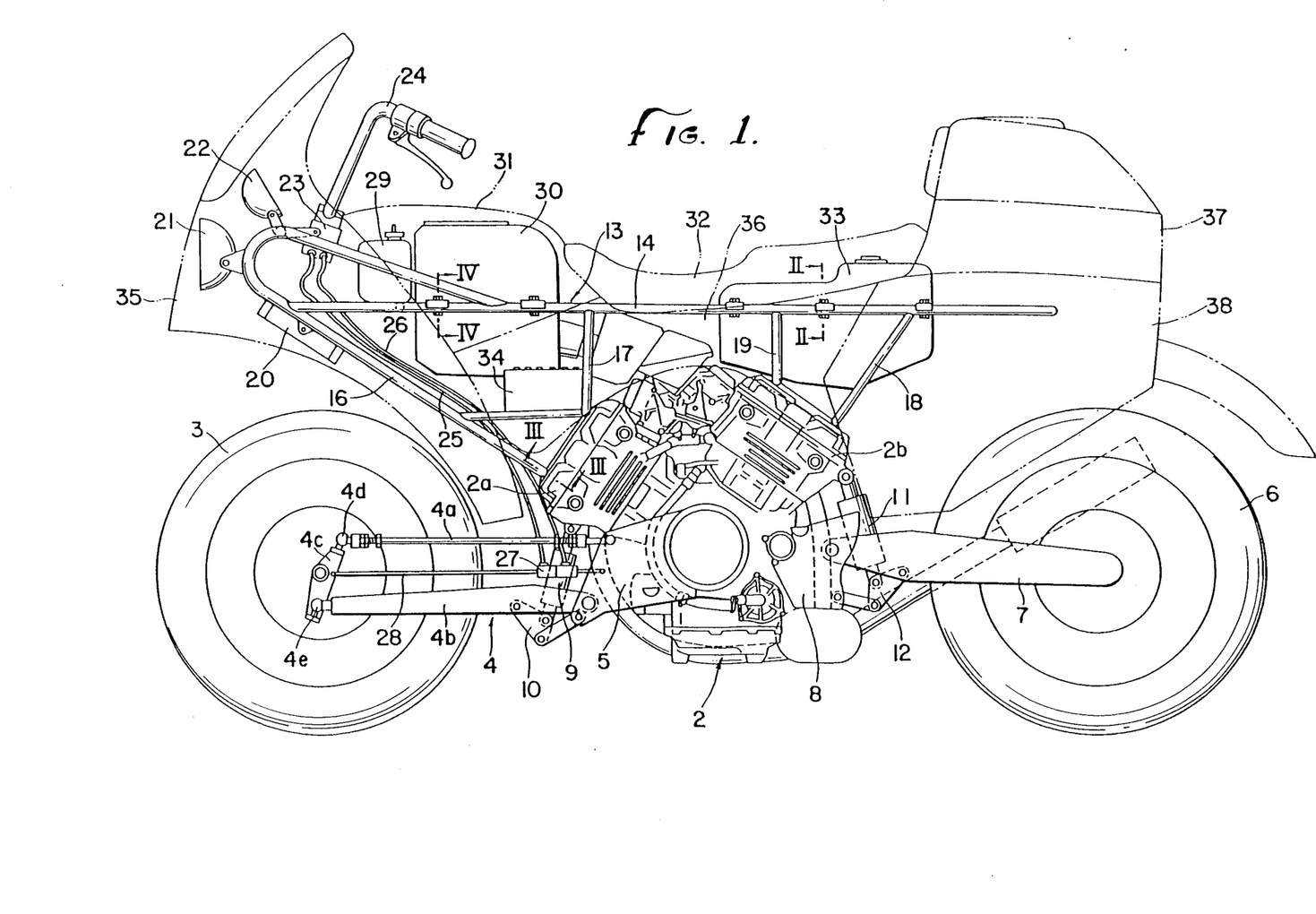
FIG. 1 is side view of a vehicle of the present invention with body portions illustrated in phantom.
Figure 2:
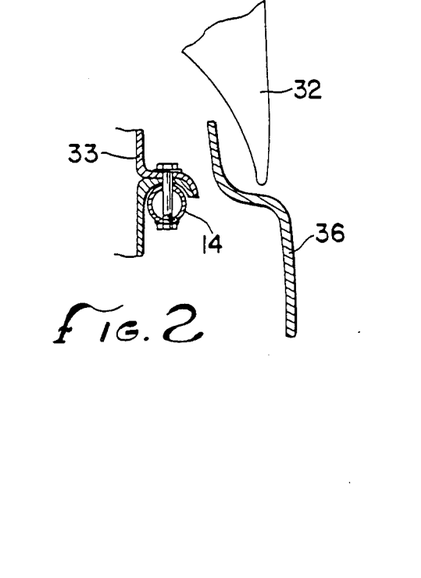
FIG. 2 is a cross-sectional view taken along line II—II of FIG. 1.
Figure 3:
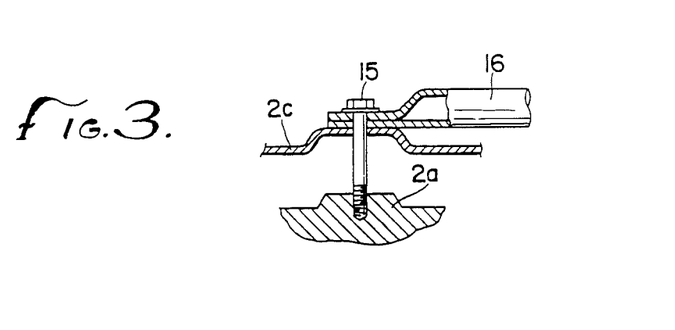
FIG. 3 is a cross-sectional view taken along line III—III of FIG. 1.
Figure 4:
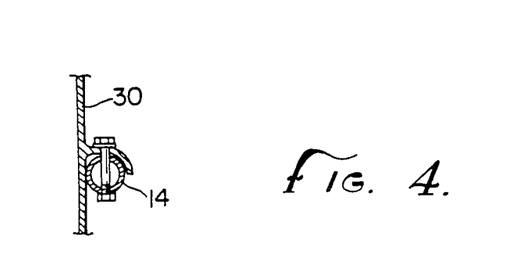
FIG. 4 is a cross-sectional view taken along line IV—IV of FIG. 1.

The front swing arm 4 consists of an upper arm 4a and a lower arm 4b. The supported ends of the arms 4a and 4b are pivotally connected to the front brackets 5. A wheel mounting member for supporting the front wheel 3 is connected at its upper end to the distal end of the upper arm 4a by means of a ball joint 4d. At the lower end of the wheel mounting member 4c, it is connected to a distal end of the lower arm 4b by means of a ball joint 4e. A cushion member 9 is shown to be coupled with the power unit 2 at a first end thereof and to the swing arm 4 via a link mechanism 10 at the other end thereof. A cushion unit 11 is also similarly arranged with respect to the rear swing arm 7, extending between the rear cylinder block 2b and a link mechanism 12.

Thus, the lower frame structure is shown to consist of the power unit 2 with the brackets 5 and 8 positioned thereon. The front and rear swing arm assemblies 4 and 7, respectively, are supported and pivotally mounted to this lower frame structure there defined.

Provided above the power unit 2 is an upper frame, generally designated 13, constructed in this embodiment of pipe. The upper frame 13 employs rails 14 extending longitudinally of the motorcycle. A front portion of the rails 14 are supported by front stays 16 fixed to a cylinder cover 2c of the cylinder block 2a by a bolt 15 as can best be seen in FIG. 3. Auxiliary stays 17, also supported by the cylinder block 2a, extend upwardly to the rails 14. A rear portion of the rails 14 are supported by rear stays 18 and auxiliary stays 19, both supported by the cylinder block 2b.

A main portion of the front stays 16 are bent in a U-shape above the rails 14 and their ends are mounted to an upper portion of the rails 14 as can best be seen in FIG. 1. The front stays 16 support a radiator 20, a headlight 21, a meter 22 and a hydraulic steering mechanism 23. Provided on the hydraulic steering mechanism 23 is a handlebar 24 which is connected to a cylinder 27 through hydraulic lines 25 and 26. The cylinder 27 is in turn connected to a steering arm 28 whose front end is in turn connected to the front wheel mounting member 4c for controlling the steering direction of the front wheel 3.

The front part of the rails 14 of the upper frame is provided with a reserve tank 29 and an air cleaner 30 which are covered by a dummy fuel tank cover 31. Rearwardly of the dummy tank cover 31 is a seat 32. A fuel tank 33 is provided below and rearwardly of the seat 32. A battery 34 is mounted below and laterally displaced from the air cleaner 30.

A front portion of the motorcycle body is covered by a front cover 35, also illustrated in phantom, which extends about the front headlight 21 and to either side of the front stays 16. Side covers 36 extend from the front cover 35 rearwardly for covering the lower sides of the air cleaner 30 and the lower portion of the seat 32. Rearwardly of the seat 32 is a center trunk 37 and side boxes 38.

The employment of the upper frame 13 as described facilitates assembly and partial disassembly of the vehicle. The various components such as the headlight 21, the meter 22, the air cleaner 30, the fuel tank 33, the seat 32 and other such motorcycle equipment can be mounted to the upper frame independently of the lower frame structure and suspension system.

Figure 6:
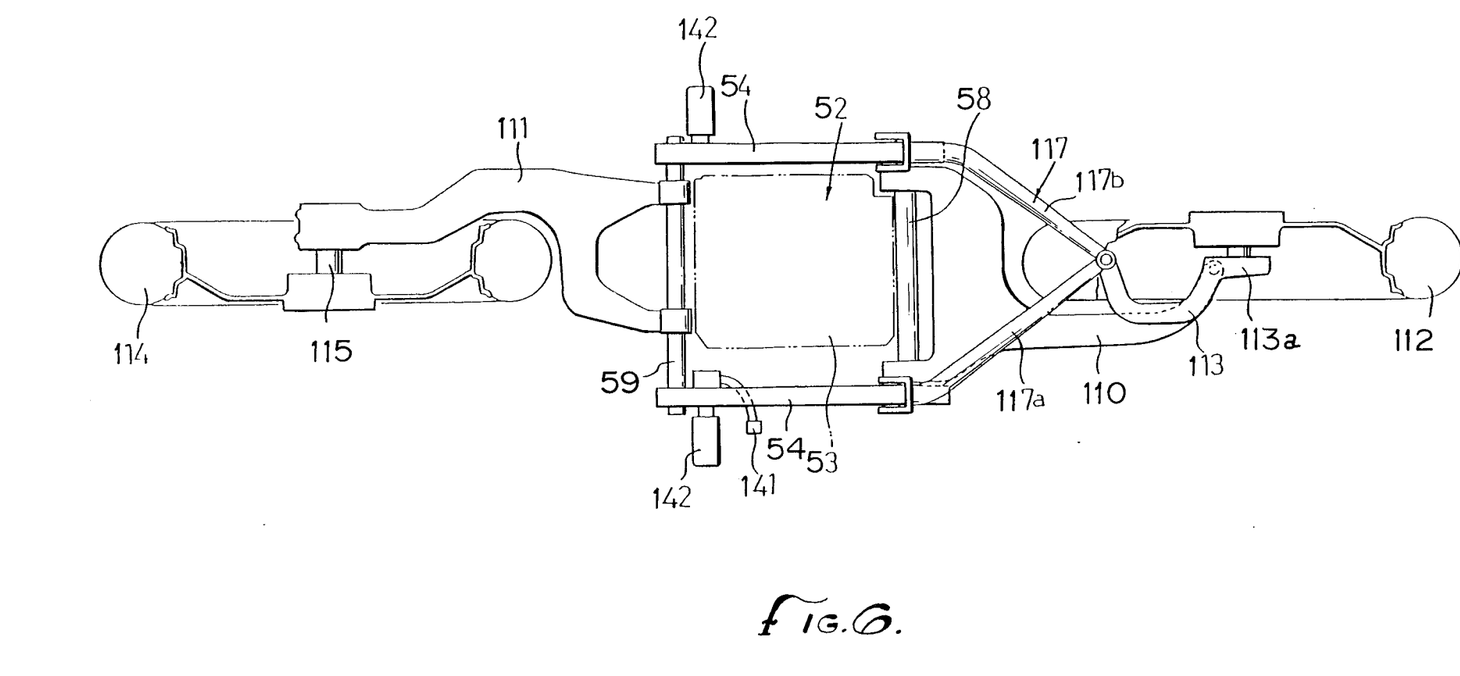
FIG. 6 is a plan view of the frame and suspension layout of the device of FIG. 5.
Figure 7:
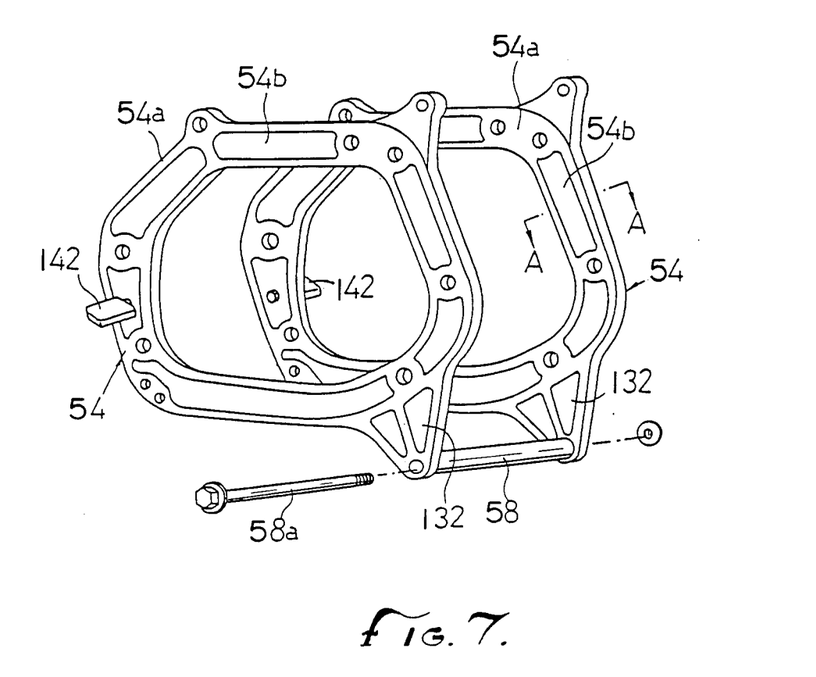
FIG. 7 is an exploded perspective view of the frame members of the embodiment of FIG. 5.
Figure 8:
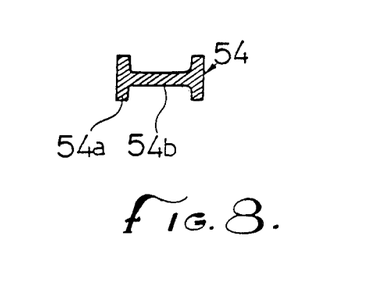
FIG. 8 is a cross-sectional view taken along line A—A of FIG. 7.

A second embodiment of the present invention is illustrated in FIGS. 5 through 8. A frame structure 52 is provided at a center of the motorcycle in this embodiment. This lower frame 52 consists of a power unit 53 and frames 54 which are generally arranged in an oval loop. The frames 54 lie generally parallel to the longitudinal direction of the motorcycle. The power unit 53 consists of a V-type engine 55 having a forwardly leaning front cylinder block 55a and a rearwardly leaning rear cylinder block 55b. The unit 53 also consists of a transmission case 56 provided at the rear end of the engine 55. The side frames 54, located on both right and left sides of the power units 3 may be made of steel plates, integral castings of aluminum alloy, integral castings of aluminum alloy and reinforcing fibers, laminates of aluminum alloy plate or fiber reinforced panels. The sides of the frames 54 are such that they cover a significant portion of the side surfaces of the power unit 54 except for the cylinder head portions thereof. Appearing through the center of each loop frame member 54 is a crankcase cover and a transmission case cover. The cross section of the side frames 54 in this embodiment are illustrated in FIG. 8 as being in an I-beam shape consisting of thick portions 54a and a thin center web 54b. Since the side frames 54 are in the form of loops having an I-beam cross section, they can be light yet sufficiently strong for mounting the suspension systems and the engine.

Figure 5:
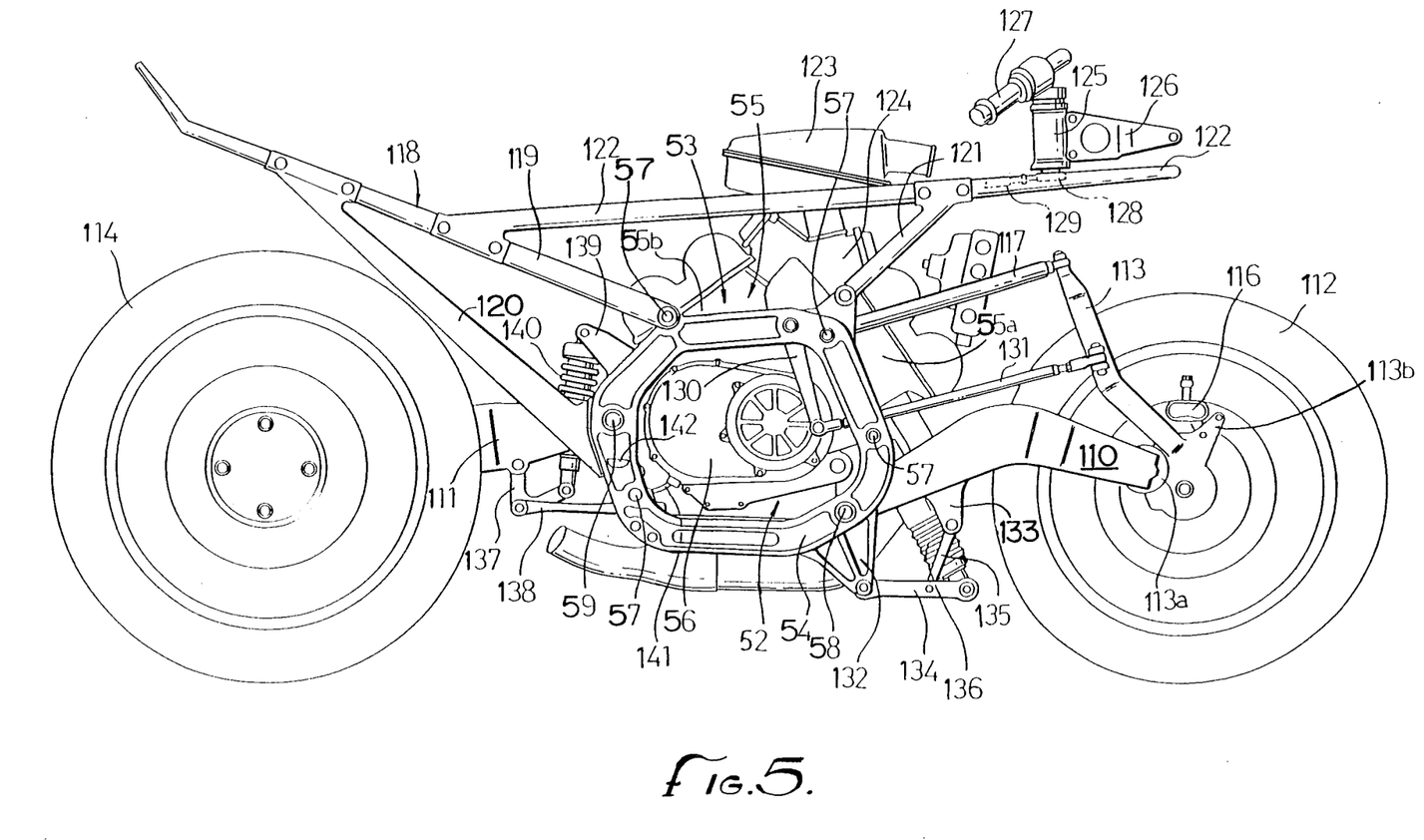
FIG. 5 is a side view of a motorcycle without the body thereon illustrating a second embodiment of the present invention.

The side frames 54 are fixed to the power unit 53 with knock bolts 57. Some of these knock bolts 57 also serve to fix other parts such as brackets for the mounting of other portions of the vehicle. This results in a reduction in the number of parts used.

Provided between the right and left side frames 54 are tubular shafts 58 and 59 for receiving bolts 58a, as can best be seen in FIGS. 6 and 7 to form pivot mounts. The front tubular shaft 58 pivotally supports the base end of a front lower arm 110 while the rear tubular shaft 59 pivotally supports the base end of a rear arm 111. Each of the front lower arm 110 and rear arm 111 have a base end including spaced apart mounting elements defining a forked or triangular shape. The lower am 110 has a middle portion bent to the right and upwardly and a front end portion connected to the lower end of a wheel mounting member or steering arm 113 for a front wheel 112. The rear arm 111 has a middle portion which is bent toward the left and a rear portion rotatably supporting an axle 115 for a rear wheel 114. Thus, the lower swing arm 110 and the rear swing arm 111 form an S-shape as can be seen in plan in FIG. 6.

The steering arm 113 is, at its base end, integrally provided with a connecting bracket 113a for the lower arm 110. A mounting bracket 113b is provided for a brake caliper 116. The steering arm 113 extends upwardly and is bent to the right so that the upper end thereof is positioned above the front wheel 112. The upper end of the steering arm 113 is connected to a front end of an upper arm 117. As shown in FIG. 6, the upper arm 117 consists of both right and left members 117a and 117b. The right member 117b is pivotally connected to an upper portion of the right side frame 54 and the left member 117b is pivotally connected to an upper portion of the left side of the frame 54 through the knock bolt 57.

Pivotally supported by a rear portion of the side frame 54 is a brake pedal 141. Steps 142 are also fixed to the rear portions of the side frames 54. An upper frame, generally designated 118 is also mounted to the side frames 54. Seat rails 119 and cross frames 120 extend rearwardly and upwardly from the side frames 54. The cross frames 120 extend to a middle portion of the seat rails 119 where they are rigidly fixed. Thus, a triangular frame structure is defined by these elements. Provided above the side frame 54 on the upper frame 118 are upper rails 122 fixed to the lower frame by means of a stay 121. The upper rails 122 are connected to a middle portion of the seat rails 119 and are fixed thereto. A seat is mounted onto a rear half portion of the seat rails 119 and a rear half portion of the upper rails 122.

A middle portion of the upper rails 122 support an air cleaner 123 which takes in air and supplies it to the carburetor 124 mounted between the front and rear cylinders 55a and 55b. The air cleaner 123 is received in a concaved portion formed in a lower wall of a fuel tank also positioned on the vehicle but not shown.

Fixed between the front portions of the upper rails 122 is a steering post 125 having a bracket 126 extending forwardly therefrom. A headlight or a fairing may be mounted onto the bracket 126. The steering post 125 receives a steering stem, an upper end of which receives a handlebar 127. A lower end of the steering stem is fixed to an arm 128 connected to one end of a steering rod 129. The steering rod 129 is connected to an arm 130 pivotally supported by the side frame 54 by means of a shaft (not shown). A front end of the arm 130 is connected to a middle portion of the steering arm 113 by means of a linking rod 131. Thus, the rotation of the steering handlebar 127 results in the rotation of the steering stem which is in turn transmitted to the steering rod 129 by means of the arm 128. This linear movement causes the arm 130 to move back and forth which in turn moves the linking rod 131 back and forth. The linking rod 131 rotates the steering arm 113 laterally, changing the steering direction of the front wheel 112.

A pair of brackets 132 depend from the front lower portions of the side frames 54. A bracket 133 depends from a middle portion of the lower arm 110. Connected between these brackets 132 and 133 are links 134 and 135. One end of the link 135 is connected to a middle portion of the link 134. A cushion member 136 is provided between a front end of the link 135 and the frame 52. A front suspension mechanism constituted by these links 134, 135 and 136 exhibits progressive cushioning characteristics.

Pivotally connected to a middle portion of the rear arm 111 is one end of a L-shaped link 137. The middle portion of the link 137 is coupled to the lower frame 52 by means of a link 138. A cushion member 140 is provided between the other end of the L-shaped link 137 and a bracket 139 which is integrally mounted on the frame 52. A rear suspension mechanism defined by these members also exhibits progressive cushioning characteristics.

Looking next to the embodiment of FIGS. 9 through 12, a power unit 62 is again shown located at the center of the vehicle and consisting of a V-type engine 64 having a forwardly leaning front cylinder block 64a and a rearwardly leaning rear cylinder block 64b. The engine is supported on a lower channel or support member 63.

Figures 9, 10:
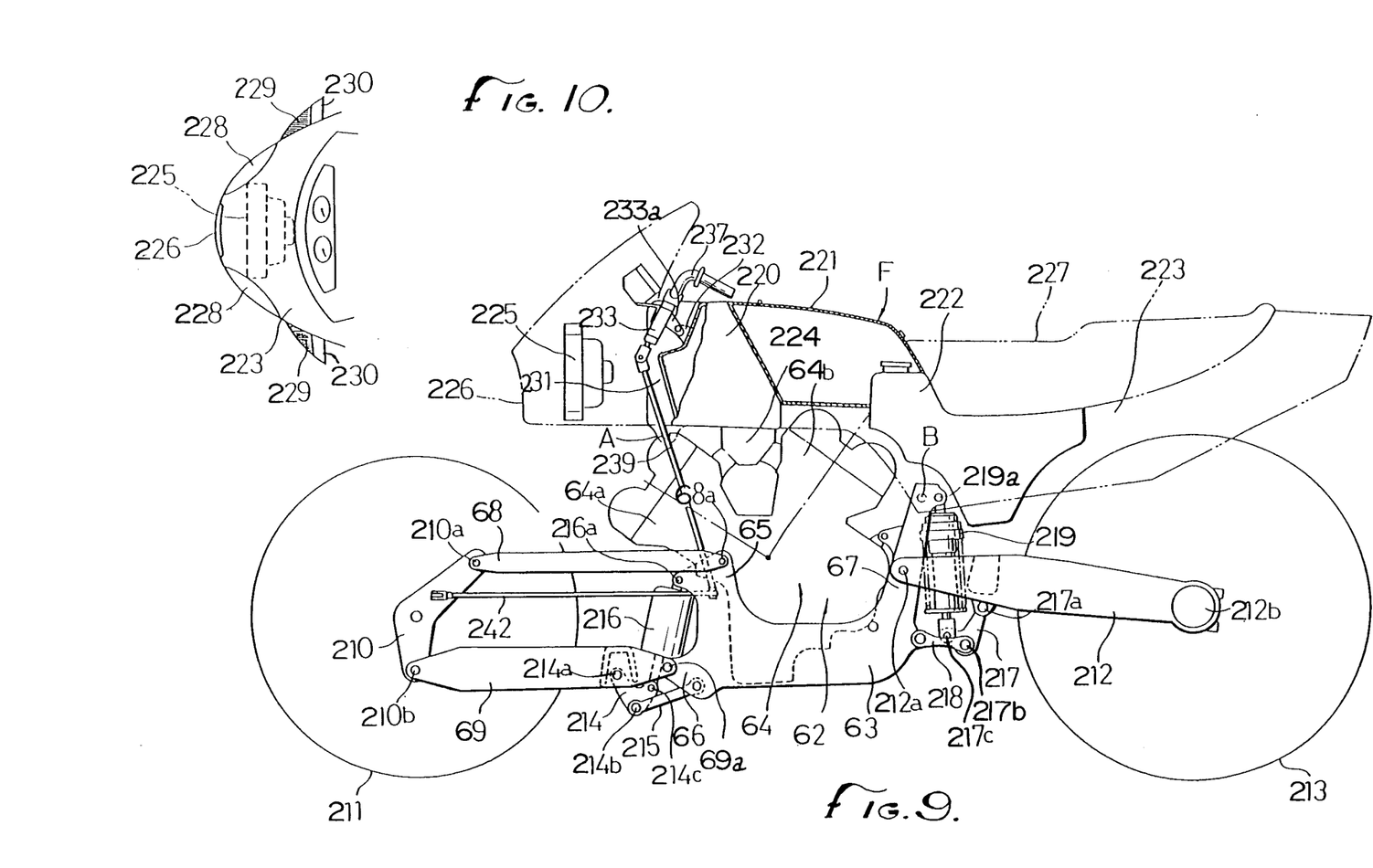
FIG. 9 is a side view of another embodiment of a motorcycle of the present invention with body portions illustrated in phantom.
FIG. 10 is a plan view of the front portion of the motorcycle of FIG. 9.

The support member 63 may be made of a steel plate, an integral casting of an aluminum alloy, a laminate of an aluminum alloy plate and a carbon fiber reinforced panel or a laminate of a fiber reinforced plastic panel and an aluminum honeycomb plate. Other such possibilities may also be employed. The support member 63 is in the form of a channel having right and left sidewalls integrally connected with a bottom wall. A front end of each of the sidewalls is provided with an upper projection 65 and a lower projection 66. At the rear end of each sidewall there is provided an upper projection 67. Both upper projections 65 and 67 are connected to the power unit 64 to increase the strength of the entire power unit as a lower frame.

Pivotally supported by the upper projections 65 is a rear end 68a of an upper front swing arm 68. Pivotally supported by the lower projections 66 is a rear end 69a of a lower front swing arm 69. These swing arms 68 and 69 bend outwardly but swing in substantially the same vertical plane. Front ends of the swing arms 68 and 69 are pivotally connected to the upper and lower ends 210a and 210b of a steering plate 210. This steering plate 210 in turn rotatably supports a front wheel 211. Pivotally supported by the rear upper projection 67 is a front end 212a of a rear swing arm 212 whose rear end in turn rotatably supports a rear wheel 213.

Pivotally connected to a rear end portion of the lower front swing arm 69 is a front end 214a of an L-shaped link 214. A middle portion 214b of the L-shaped link 214 is connected to the lower projection 66 by means of a bar link 215. A rear end 214c of the L-shaped link 214 supports a lower end of a cushion member 216. An upper end 216a of the cushion member 216 is supported by the upper projection 65. With the cushion member 216 supported by the links 214 and 215, a progressive cushioning effect is achieved. Also a front portion of the rear swing arm 212 is pivotally connected with a rear end 217a of an L-shaped link 217. A middle portion 217b of the L-shaped link 217 and the upper projection 67 are connected to each other by means of a bar link 218. A cushion member 219 is supported at its lower end by a front end 217c of the L-shaped link 217 and is also supported at its upper end 219a by a top portion of the upper projection 67. Again, this linkage mechanism provides a progressive cushioning effect.

With respect to the upper portion of the motorcycle, an upper body defined by box frames F is employed. The box frames F may include an air cleaner case 220, a container box 221 and a fuel tank 222 all fixed to the lower frame of the vehicle which includes the power unit 64. Such affixing of the upper frame consisting of the box frames F is accomplished in the embodiment at positions A and B. The air cleaner case 220, the container box 221 and the fuel tank 222 are covered by a cowling 223, illustrated in phantom which is provided with a seat 227 in a rear portion thereof. Provided below the air cleaner case 220 is a carburetor 224.

Provided within the cowling 223 in front of the air cleaner case 220 is a radiator 225 into which cooling air is introduced through an opening 226 provided at a front end of the cowling 223. As seen in FIG. 10, the cowling 223 is provided with a pair of headlights 228 on either side of the front end thereof. Also provided on the cowling 223 rearwardly of the headlights 228 are a pair of turn signals 229, each combined with a rear view mirror 230.

The air cleaner case 220 is made of a high strength material such as sheet steel. It is provided with a concavity 231 at a front side thereof to receive a bracket 232 projecting forwardly. The bracket 232 is fixed with a bracket 233a of a steering pivot 233 in such a manner that its position can be adjusted back and forth.

Figure 11:
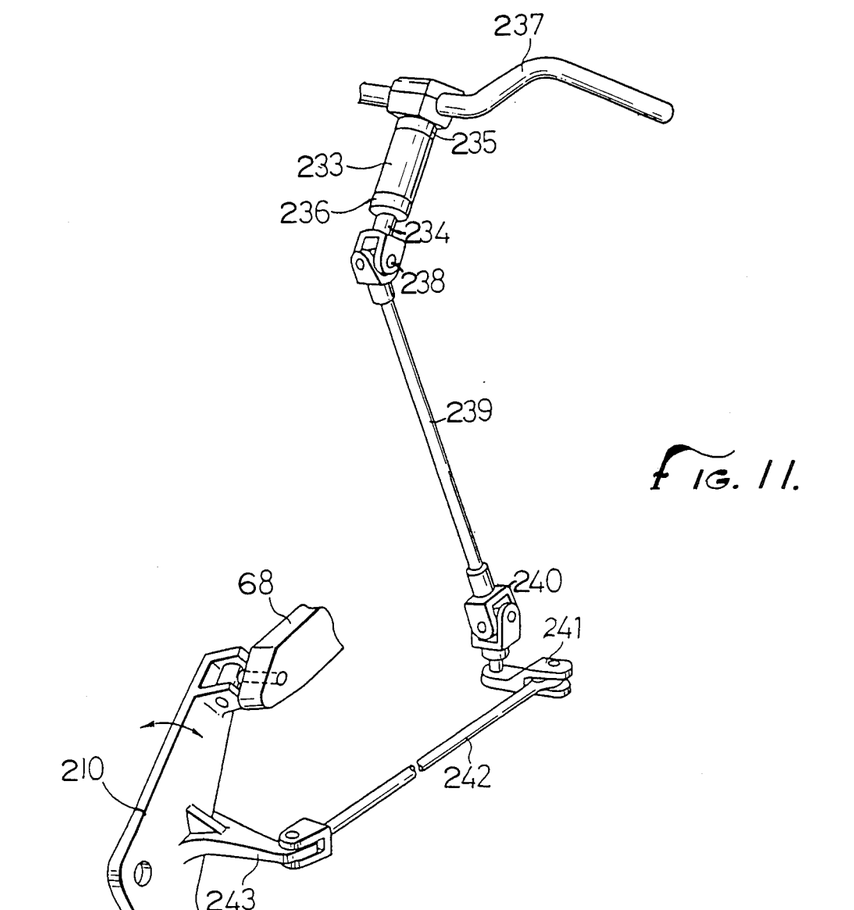
FIG. 11 is a perspective view of the steering assembly of the embodiment of FIG. 9.
Figure 12:
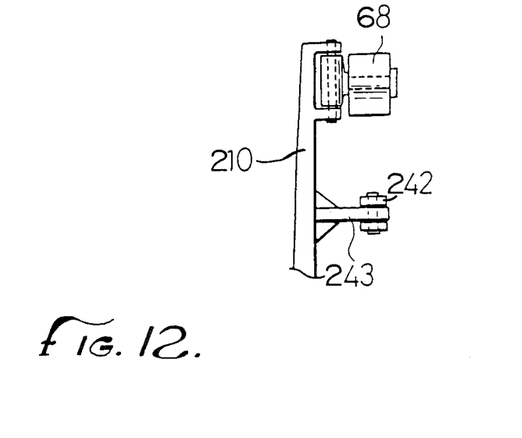
FIG. 12 is a front view of the steering plate of the device of FIG. 11.

As shown in FIG. 11, the steering pivot 233 rotatably receives the steering stem 234. The steering pivot 233 has bearings 235 and 236 at the upper and lower ends thereof to receive the stem. The stem bearing 235 is fixed to a steering handle 237 so that the steering handle 237 and the steering stem 234 are rotated together.

The lower end of the steering stem 234 is connected to an upper end of a steering rod 239 by means of a universal joint 238. At the lower end of the steering rod 239, it is connected by means of a joint 240 to an arm 241. The arm 241 is pivotally supported by the upper projection 65 of the support member 63. The arm 241 is in turn pivotally connected to a rear end of a linking rod 242. The front end of the linking rod is pivotally connected to a lever 243 projecting sideways from the steering plate 210 as can best be seen in FIG. 12. Thus, the swinging of the handlebar 237 is transmitted to the steering plate 210 through the steering stem 234, the steering rod 239 and the linking rod 242. The rotation of the steering plate 210 in the direction as shown in FIG. 11 changes the direction of the front wheel 211.

Figure 13:
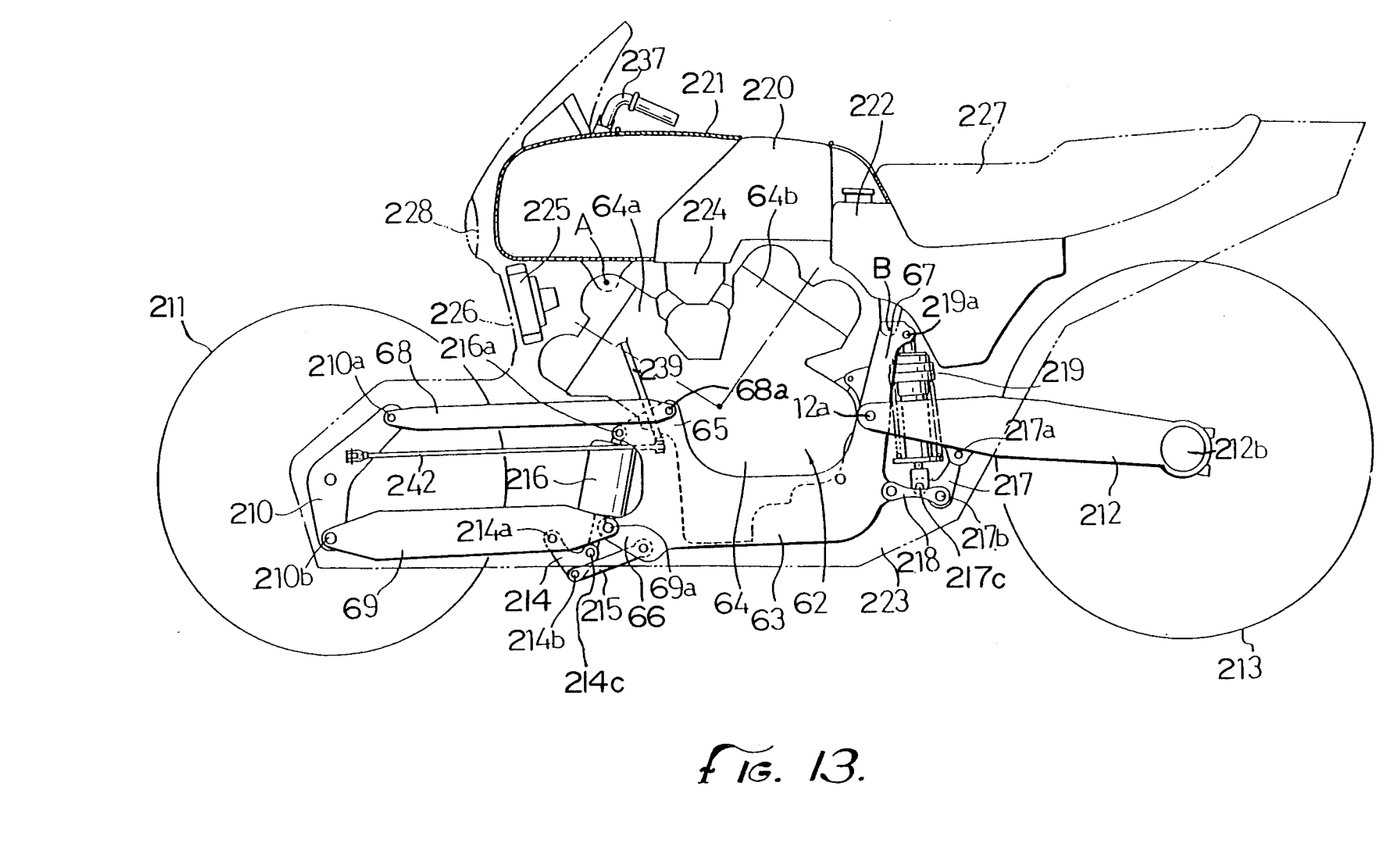
FIG. 13 is a side view of a motorcycle of yet another embodiment of the present invention.

FIG. 13 is a side view of yet another embodiment of the present invention comprising a container box 221 mounted between the engine 64 and a handlebar 237. An air cleaner case 220 is provided rearwardly of the container box 221. A fuel tank 222 is provided rearwardly of the air cleaner case 220 and a radiator 225 is provided in a space defined between the container box 221 and the engine 64. Further, in the embodiment of FIG. 13, more than half the sidewalls of the motorcycle body including the power unit 62 and the swing arms 68 and 69 are covered by the cowling 223 illustrated in phantom.

The above embodiments of FIGS. 9 through 13 illustrate box-like frame structures defining the upper frame from the parts including the air cleaner case 220, the container box 221 and the fuel tank 222. However, other parts may be so arranged to define the upper frame structure. However, the air cleaner case 220 is preferably mounted directly to the carburetor 224. An oil cleaner may be employed instead of the radiator 225.

Thus, several embodiments of an improved motorcycle having a lower frame structure supporting front and rear swing arms and incorporating as a part of that structure the engine of the vehicle. Variations of an advantageous upper frame structure which is not employed to support the suspension assemblies are used in combination with the lower frame structure. While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:
1. A motorcycle comprising:
longitudinally spaced front and rear wheels;
a power unit intermediate said wheels;
lower frame means including vertically extensive longitudinally extending frame members rigidly fixed to opposite sides of said power unit;
oppositely directed front and rear swing arms having one of their respective ends being pivotally supported by the opposite longitudinal ends of said lower frame members;
a cushion member extending between and connecting each said swing arm with respect to said lower frame members;
ancillary motorcycle equipment; and
upper frame means structurally independent of said swing arms and said cushion members, said upper frame means being fixedly attached to and extending upwardly from said lower frame means and being arranged for supporting said ancillary motorcycle equipment.

2. The motorcycle according to claim 1 wherein said frame members comprise upstanding loop structures disposed along each lateral side of said power unit.

3. The motorcycle according to claim 1 wherein said lower frame means comprises a longitudinally elongated channel member fixed to said power unit, said channel member having a bottom wall and oppositely spaced sidewalls upstanding from said bottom wall on opposite sides of said power unit, each of said upstanding channel sidewalls containing means at the longitudinally spaced ends thereof for connecting said front and rear swing arms and said cushion members, respectively, and means in the upper portion of said sidewalls for securing said upper frame means.

4. The motorcycle according to claim 1 wherein said upper frame means includes rails for supporting said ancillary equipment extending longitudinally of said motorcycle; and stays extending to and supporting said rails.

5. The motorcycle according to claim 1 wherein said upper frame means includes box frames for containing said ancillary motorcycle equipment; and means for connecting said box frames to said lower frame means.

* * * * *